United States Patent
Kitamoto

(10) Patent No.: US 8,481,923 B1
(45) Date of Patent: Jul. 9, 2013

(54) ATMOSPHERIC PRESSURE PLASMA MASS SPECTROMETER

(75) Inventor: Jun Kitamoto, Musashino (JP)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 13/537,285

(22) Filed: Jun. 29, 2012

(51) Int. Cl.
   *B01D 59/44* (2006.01)
(52) U.S. Cl.
   CPC ..................................... *B01D 59/44* (2013.01)
   USPC .......................................... 250/281; 250/289
(58) Field of Classification Search
   USPC ................................................ 250/281, 289
   See application file for complete search history.

(56) References Cited

U.S. PATENT DOCUMENTS

| | | | |
|---|---|---|---|
| 7,811,065 B2 * | 10/2010 | Stuart et al. | ............ 417/250 |
| 2011/0142686 A1 * | 6/2011 | Stuart et al. | .............. 417/49 |

FOREIGN PATENT DOCUMENTS

WO   00/16375   3/2000

* cited by examiner

*Primary Examiner* — Kiet T Nguyen

(57) ABSTRACT

A mass spectrometer includes first to fifth vacuum chambers and a single split-flow turbo molecular pump. The first vacuum chamber draws an ionized sample from atmospheric pressure plasma. The second vacuum chamber includes means for extracting and guiding an ion beam from ions from the first vacuum chamber. The third vacuum chamber includes first ion-optical separator means. The fourth vacuum includes a collision/reaction cell into which collision/reaction gas is introduced. The fifth vacuum chamber includes second ion-optical separator means and a detector. The split-flow turbo molecular pump has multiple inlets for differentially evacuating the second, third, fourth and fifth vacuum chambers. The fourth vacuum chamber is connected to an inlet of the split-flow turbo molecular pump providing a pressure higher than a pressure of an inlet of the split-flow turbo molecular pump to which the third vacuum chamber is connected.

20 Claims, 4 Drawing Sheets

ATMOSPHERIC PRESSURE PLASMA MASS SPECTROMETER

BACKGROUND

The present disclosure relates to a mass spectrometer that uses atmospheric pressure plasma as an ion source, and more particularly, to a differential vacuum system used in such a mass spectrometer.

Mass spectrometers that use atmospheric pressure plasma, such as a microwave induced plasma (MIP) or an inductively coupled plasma (ICP), may be used for determining elemental composition of a sample, especially of inorganic materials, such as metallic alloys or geological samples, dissolved in an aqueous solution. In conventional mass spectrometers, the aqueous solution is nebulized into the plasma and resulting elemental ions are extracted into a mass analyzer through an interface, which is a first evacuated region including a sampling cone. A skimmer cone, located behind or downstream of the sampling cone, divides the first evacuated region from a second evacuated region, in which ion optical components, such as extraction electrodes and ion lenses, are situated for maximizing transmission of ions from the plasma into the mass analyzer. The mass analyzer is typically a quadrupole mass analyzer.

The basic principle underlying atmospheric pressure plasma mass spectrometry has not changed, but the technology has evolved over the decades to provide significant improvements, including the provision of tandem (MS/MS) mass spectrometers. An MS/MS mass spectrometer has more than one mass analyzer, typically two quadrupole mass analyzers. The two mass analyzers are separated by a collision/reaction cell into which gas having a relatively small molecular weight, such as hydrogen or helium, is admitted to collide and react with unwanted molecular species which cause spectral interferences. For instance, multi-atomic ions attributable to carrier gas in the sample can be neutralized through the collision/reaction cell, and spectral interference problems otherwise caused by multi-atomic ions in the mass analyzer can be resolved.

An illustrative, experimental implementation of MS/MS mass spectrometry is provided by PCT/GB99/03076 (WO 00/16375), disclosing an inductively coupled plasma mass spectrometer in which a collision cell is employed to selectively remove unwanted artifact ions from an ion beam by causing them to interact with a reagent gas. For purposes of discussion, FIG. 1 herein substantially reproduces FIG. 2 of WO 00/16375. Referring to FIG. 1, a conventional mass spectrometer 110 includes evacuated chambers, containing an ion optical device and a collision cell, divided into first evacuated chamber 106, second evacuated chamber 120 and third evacuated chamber 133. The first evacuated chamber 106 includes an extractor lens 108 and a quadrupole mass filter 117, and is maintained at a high vacuum of about $10^{-2}$ mbar to about $10^{-4}$ mbar. The second evacuated chamber 120 contains a collision cell 124 pressurized with gas 126, and is maintained at a lower pressure (higher vacuum) than the first evacuated chamber 106, typically about $10^{-3}$ mbar to about $10^{-5}$ mbar. The third evacuated chamber 133 is arranged after the second evacuated chamber 120, and contains a quadrupole mass filter 137 and a detector 138. The third evacuated chamber is maintained at a lower pressure (higher vacuum) than the second evacuated chamber 120, typically about $10^{-4}$ mbar to about $10^{-6}$ mbar.

With the provision of the first evacuated chamber 106, the disclosure of WO 00/16375 proposes to reduce the gas load on the collision cell 124 from inductively coupled plasma source 101. To this end, the first evacuated chamber 106 is evacuated by a high-vacuum pump, such as a turbo-molecular pump (not shown), to as low as about $10^{-4}$ mbar. This may be the best possible vacuum attainable with the vacuum arrangement disclosed in WO 00/16375, as the first evacuated chamber 106 is separated from the inductively coupled plasma source 101 only by an expansion chamber 103, which is known to be a coarse vacuum stage.

However, the quadrupole mass filter 117 contained in the first evacuated chamber 106 usually requires a relatively high frequency, high voltage AC source of several MHz and several kV, overlapped with DC current on the order of several hundreds of amperes. When the mass spectrometer 110 is operated under the given conditions, discharge may occur at the quadrupole mass filter 117, which could deteriorate or disable the filtering operation and increase background noise. Further, under the aforementioned vacuum conditions, the average free flight distance through the quadrupole mass filter 117 may not be sufficient for some ion species, which could result in insufficient mass selectivity and mass resolution.

Japanese Patent Application No. 2012-001616, entitled "Inductively Coupled Plasma MS/MS Mass Spectrometer" and having a common assignee hereof, attempts to address the above issues. The disclosed Inductively Coupled Plasma MS/MS Mass Spectrometer (ICP-MS/MS) comprises a first vacuum chamber, a second vacuum chamber, a third vacuum chamber, a fourth vacuum chamber, and a fifth vacuum chamber, connected in series. The first vacuum chamber draws sample ions from the atmospheric pressure plasma and passes them to the subsequent stages. The second vacuum chamber includes means for extracting and guiding an ion beam from the ions emanated from the first vacuum chamber. The third vacuum chamber includes a first mass analyzer, such as a first quadrupole mass filter, for selecting and rejecting ions according to a particular mass-to-charge ratio. The fourth vacuum chamber includes a collision/reaction cell into which gas is introduced for removing spectral interferences which would otherwise be caused by multi-atomic ions. The fifth vacuum chamber includes second mass analyzer, such as a second quadrupole mass filter, and a detector, such as an electron multiplier detector. Japanese Patent Application No. 2012-001616 proposes to evacuate the first to fifth vacuum chambers separately and individually. For example, it proposes to evacuate the second and third vacuum chambers separately, so that the third vacuum chamber containing the first quadrupole mass filter can be evacuated to a high vacuum and ions can have a longer average free flight distance.

The vacuum system disclosed in the Japanese Patent Application No. 2012-001616 includes a rotary pump for evacuating the first vacuum chamber, and multiple turbo molecular pumps for evacuating the second through fifth vacuum chambers, which may be backed by the rotary pump. A split-flow turbo molecular pump comprising multiple ports may be used, but in that case the pressure at one port differs from another, and care must be taken such that gas introduced into the collision/reaction cell in the fourth vacuum chamber will not be introduced into the third vacuum chamber due to the pressure difference. When a partial pressure of the gas increases in the third vacuum chamber, there is a risk of discharge or decrease in sensitivity.

SUMMARY

In various embodiments, a mass spectrometer includes five chambers that are separately and individually evacuated as in Japanese Patent Application No. 2012-001616. The first vacuum chamber is evacuated by a rotary pump. However, the second to fifth vacuum chambers are evacuated by a single split-flow turbo molecular pump, where the fourth vacuum chamber is connected to a vacuum port or inlet of the split-flow turbo molecular pump having a pressure higher than the pressure of a vacuum port or inlet of the split-flow turbo molecular pump to which the third vacuum chamber is connected.

The first vacuum chamber may be evacuated to a pressure of about 350 Pa to about 500 Pa, for example. The second vacuum chamber is connected the fourth (highest pressure and lowest vacuum) inlet of the single split-flow turbo molecular pump, and may be evacuated to a pressure of about 0.1 Pa to about 0.5 Pa, for example. The fourth vacuum chamber is connected to the third inlet and evacuated to the next lower pressure, which may be in the range of about $1 \times 10^{-3}$ Pa to about $5 \times 10^{-2}$ Pa, for example, but upon introduction of gas (e.g., hydrogen or helium) into the collision/reaction cell of the fourth vacuum chamber, the pressure in the fourth vacuum chamber may increase due to the pressure of the introduced gas. The third vacuum chamber is evacuated to a pressure lower than that of the fourth vacuum chamber, as it is connected to the second inlet of the split-flow turbo molecular pump, which is the inlet upstream of the inlet to which the fourth vacuum chamber is connected. The pressure of the third vacuum chamber may be about $1 \times 10^{-4}$ Pa to about $2 \times 10^{-2}$ Pa, for example. The fifth vacuum chamber is connected the first inlet (lowest pressure and highest vacuum) of the split-flow turbo molecular pump, and may be evacuated to a pressure of about $1 \times 10^{-5}$ Pa to about $5 \times 10^{-3}$ Pa, for example.

The split-flow turbo molecular pump has four ports or inlets, which are maintained at different pressure levels during operation. The inlets are associated with differential pumping stages, each of which includes a set of blades rotatable about the same axis. The first inlet, which is situated at an upstream end of the split-flow turbo molecular pump, is evacuated through the first to fourth pumping stages. A vacuum chamber requiring the lowest pressure (highest vacuum) is connected to the first inlet. The second inlet is associated with spacing between the first pumping stage and the second pumping stage, and is evacuated through the second to fourth pumping stages. A vacuum chamber requiring next to the lowest pressure (next to the highest vacuum) is connected to the second inlet. Likewise, the third inlet is evacuated through the third and fourth pumping stages, and a vacuum chamber connected thereto is evacuated to the second highest pressure (next to the lowest vacuum). The fourth inlet is evacuated through the fourth pumping stage only, and a vacuum chamber to be evacuated to the highest pressure (lowest vacuum) is connected to the fourth inlet. The split-flow turbo molecular pump may be backed by the rotary pump used for evacuating the first vacuum chamber.

In various embodiments, the fifth vacuum chamber is connected to the first inlet, and the second vacuum chamber is connected to the fourth inlet. However, the third and fourth vacuum chambers are reversed, in that the third vacuum chamber is connected to the second inlet and the fourth vacuum chamber is connected to the third inlet. In contrast, in conventional configurations, where the first through fourth inlets of a split-flow turbo molecular pump are simply connected to the second to the fifth vacuum chambers in reverse order, the second inlet would be connected to the fourth vacuum chamber and the third inlet would be connected to the third vacuum chamber. This configuration may be satisfactory for mass spectrometry associated with other ionization schemes, such as electrospray ionization, in which analytes have relatively large mass numbers and molecular ions attributable to carrier gas, such as argon-containing multi-atomic ions, would not cause noise or spectral overlaps. In fact, in liquid chromatography with triple-quadrupole mass spectrometry (LC/QQQ), for example, the vacuum chamber into which gas is introduced may be the same as the vacuum chamber in which a quadrupole mass filter is disposed because the gas is introduced at a low flow rate and there would be no discharge or sensitivity problems, as long as the vacuum chamber is evacuated at a reasonable speed. However, in mass spectrometry associated with atmospheric pressure plasma for elemental analysis, when the gas introduced into the fourth vacuum chamber is evacuated through the second pumping stage via the second inlet, the evacuated gas inevitably increases its partial pressure in the third vacuum chamber before being evacuated through the third and fourth pumping stages. This increased pressure causes problems, such as discharge or decreased sensitivity.

In various embodiments, the connections between the vacuum chambers of the mass spectrometer and the inlets of the split-flow turbo molecular pump may be attained through flexible tubes. Alternatively, grooves (trenches) may be formed in a vacuum chamber housing, e.g., a housing of the mass spectrometer, and/or a pump housing, so that the necessary connections can be established when the pump is attached to the mass spectrometer. A combination of flexible tubes and grooves may also be used.

Also, in various embodiments, with the single split-flow turbo molecular pump, the pressure of the third vacuum chamber containing a first quadrupole mass filter, is sufficiently lowered without the possibility of gas entering into the third vacuum chamber through the vacuum system from the downstream fourth chamber. Accordingly, ions projected into the third vacuum chamber are able to travel over a longer average free flight distance through the first quadrupole mass filter, and sensitivity losses due to collision with gas molecules in the third vacuum chamber are substantially eliminated. Such use of the single split-flow turbo molecular pump achieves considerable benefits in terms of cost, simplicity of assembly, operation and maintenance, as well as efficiency.

According to an embodiment, a mass spectrometer comprises: a first vacuum chamber configured to draw an ionized sample from atmospheric pressure plasma; a second vacuum chamber connected to the first vacuum chamber; a third vacuum chamber connected to the second vacuum chamber; a fourth vacuum chamber connected to the third vacuum chamber; a fifth vacuum chamber connected to the fourth vacuum chamber; and a single split-flow pump having a plurality of inlets for differentially evacuating the second, third, fourth and fifth vacuum chambers. The fourth vacuum chamber is connected to an inlet of the split-flow pump providing a pressure higher than a pressure of an inlet of the split-flow pump to which the third vacuum chamber is connected.

According to another embodiment, an atmospheric pressure plasma mass spectrometer includes a vacuum chamber housing, comprising, sequentially, a rotary pump and a single split-flow turbo molecular pump. The vacuum chamber housing includes first to fifth vacuum chambers, where the third vacuum chamber contains a mass analyzer and the fourth vacuum chamber contains a collision/reaction cell. The rotary pump evacuates the first vacuum chamber. The split-flow turbo molecular pump differentially evacuates the second to fifth vacuum chambers, where the fourth vacuum chamber is connected to an inlet of the single split-flow turbo molecular pump providing a vacuum lower than a vacuum provided by an inlet of the split-flow turbo molecular pump to which the third vacuum chamber is connected.

According to another embodiment, a mass spectrometer includes multiple vacuum chambers arranged in series for receiving sample ions from atmospheric pressure plasma, and a single split-flow turbo molecular pump having multiple inlets for differentially evacuating the vacuum chambers, respectively. One vacuum chamber of the multiple vacuum chambers includes a quadrupole mass filter and receives an ion beam of the sample ions from a previous vacuum chamber, and an adjacent vacuum chamber, downstream from the one vacuum chamber, includes a collision reaction cell for introducing collision/reaction gas and receives the ion beam from the quadrupole mass filter of the one vacuum chamber. The one vacuum chamber is connected to one inlet of the split-flow turbo molecular pump providing a vacuum higher than a vacuum provided by another inlet of the split-flow turbo molecular pump to which the adjacent vacuum chamber is connected.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Representative embodiments described herein include a mass analyzer, which is a device that can distinguish ions based on their mass-to-charge (m/z) ratios. Mass analyzers contemplated for use in connection with the mass spectrometers described below include, but are not limited to, a quadrupole, time-of-flight, ion trap, orbital trap, fourier transform-ion cyclotron resonance (FT-ICR), or combination thereof. The mass spectrometers of the present teachings may comprise a tandem MS system, comprising more than one mass analyzer configured in tandem. For instance, the tandem MS system may be a "QQQ" system comprising, sequentially, a quadrupole mass filter, a quadrupole ion guide, and a quadrupole mass analyzer. The tandem MS system may also be a "Q-TOF" system that comprises a quadrupole and a time-of-flight mass analyzer.

Figure 1:
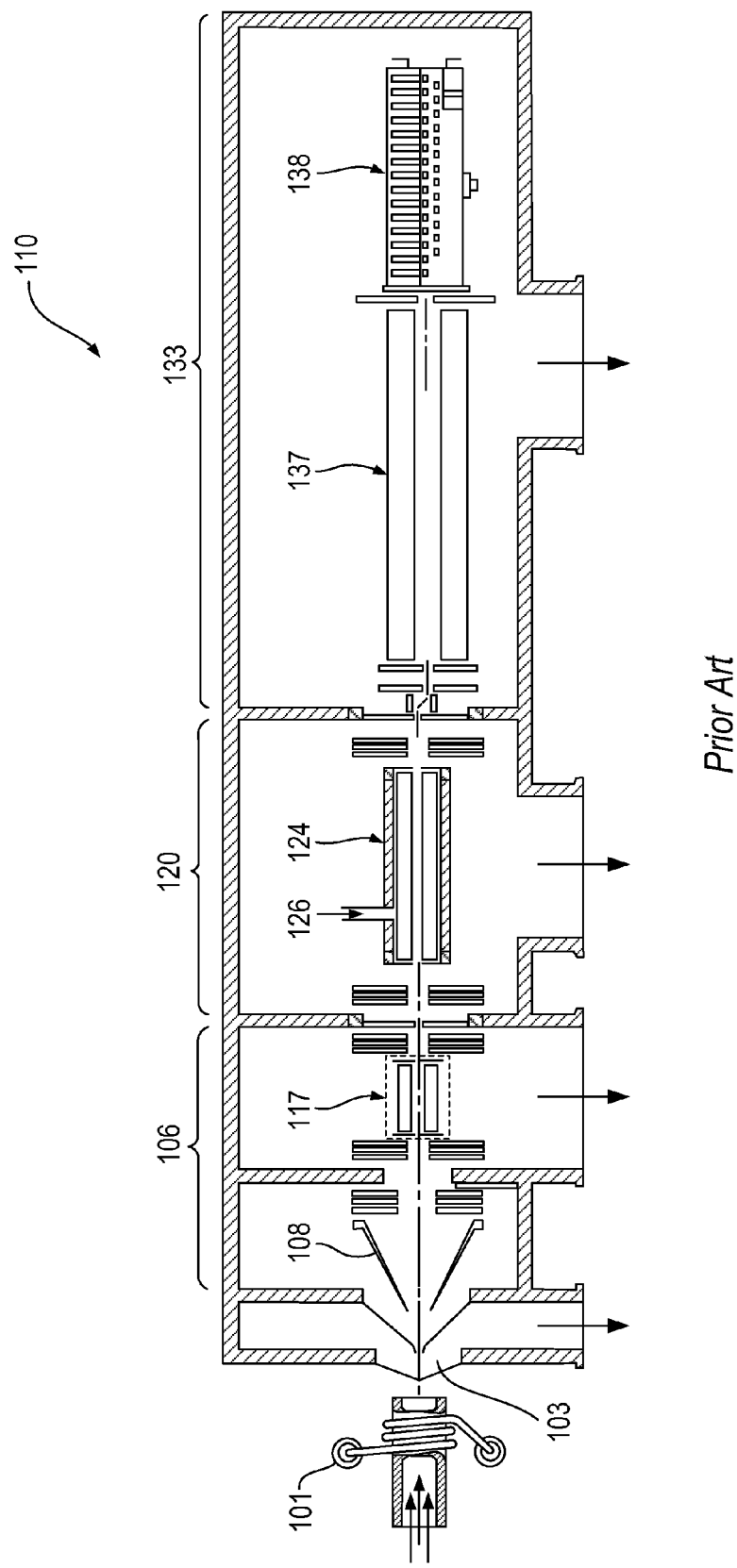
FIG. 1 is a schematic diagram of a conventional mass spectrometer.
Figure 2:
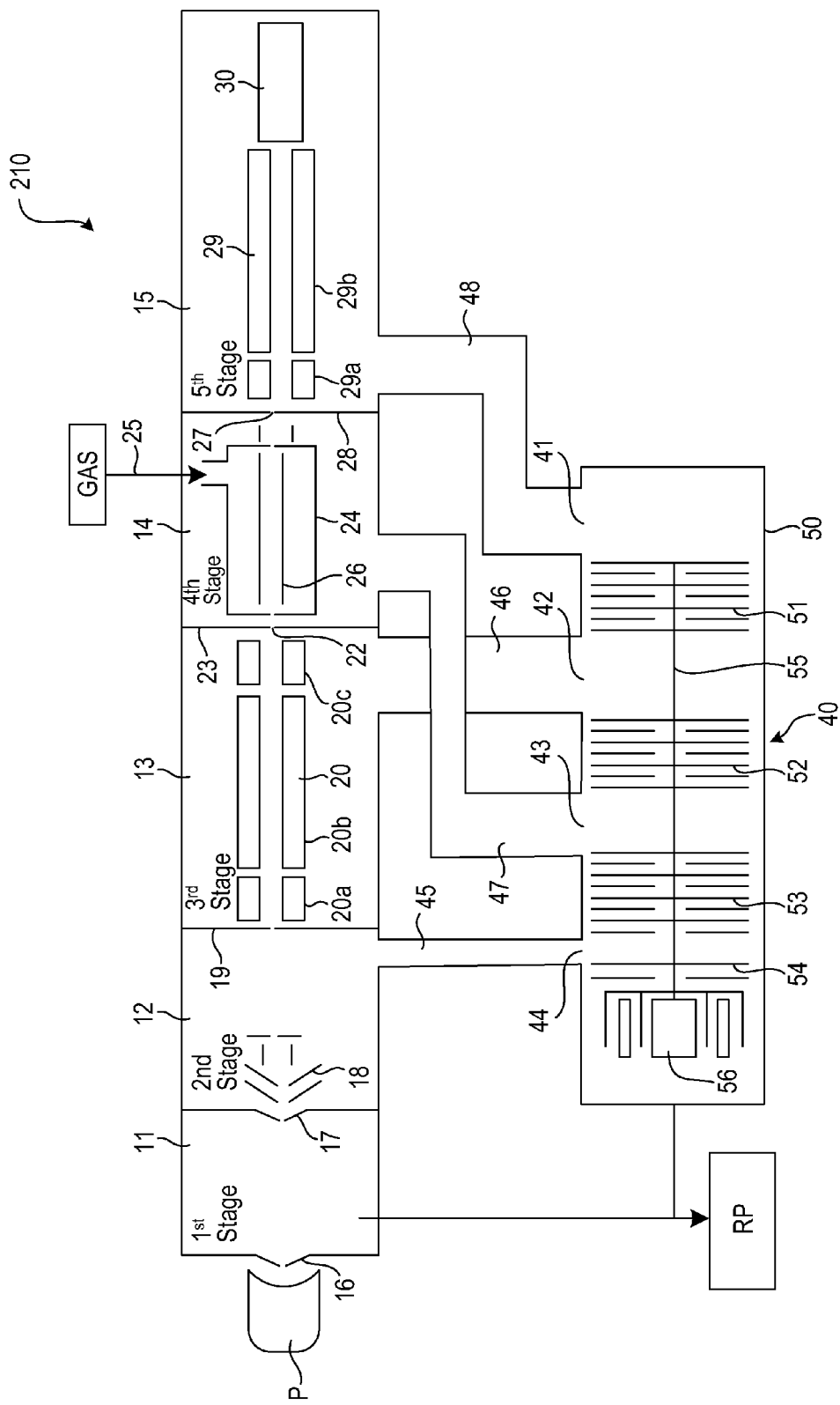
FIG. 2 is a schematic diagram showing a mass spectrometer having differential evacuation construction in accordance with a representative embodiment.

FIG. 2 is a schematic diagram showing a mass spectrometer having differential evacuation construction in accordance with a representative embodiment. Referring to FIG. 2, mass spectrometer 210 is equipped with a vacuum system, which includes a single split-flow turbo molecular pump 40 having first through fourth inlets 41-44 for evacuating multiple vacuum chambers of the mass spectrometer 210 to different vacuum levels, respectively. The multiple vacuum chambers include first through fifth vacuum chambers (or first through fifth stages) 11 to 15, which are arranged serially and divided by partitions having small orifices enabling communication between adjacent ones of the first through fifth vacuum chambers 11 to 15.

The mass spectrometer 210 includes a plasma torch (not shown), including a coil coupled to an RF source for generating inductively coupled plasma P. An aqueous solution containing a sample is delivered and nebulized as a fine aerosol into the plasma P, and resulting elemental ions are extracted into the mass spectrometer 210 through the first vacuum chamber 11 positioned adjacent to the plasma P. The first vacuum chamber 11 has an interface structure including a sampling cone 16 and a skimmer cone 17 for allowing ions to be extracted in the form of an ion beam from the plasma P into the second vacuum chamber 12. The first vacuum chamber 11 is evacuated by a coarse pump, such as a rotary pump RP, through a vacuum tube to a pressure in a range of about 350 Pa to about 500 Pa. The vacuum tube may include a valve that is moved to an open position upon activation of the mass spectrometer 210.

The plasma P drawn into the first vacuum chamber 11, including the ionized sample, passes through an orifice formed in the skimmer cone 17 and is led to the second vacuum chamber 12, located behind or downstream from the first vacuum chamber 11. Ion optical components, such as extraction electrode and ion lens 18, are arranged in the second vacuum chamber 12 behind the skimmer cone 17 for forming and guiding an ion beam, while rejecting photons and neutral species that would otherwise increase random background noise. Means other than the extraction electrode and ion lens 18 may be used, insofar as they are able to focus and transmit ions emanated from the interface structure of the first vacuum chamber 11 to the subsequent stages. The second vacuum chamber 12 is connected to the fourth inlet 44 of the split-flow turbo molecular pump 40 via a conduit 45, which provides the highest pressure (lowest vacuum) of the first through fourth inlets 41-44. The second vacuum chamber 12 is thus evacuated to a vacuum in a range of about 0.1 Pa to about 0.5 Pa, for example. The conduit 45 may be a flexible tube of an elastic material such as rubber, or may be formed as a groove engraved in a pump housing and/or a vacuum chamber housing, for example.

The third vacuum chamber 13 is arranged behind or downstream from the second vacuum chamber 12, and is separated from the second vacuum chamber 12 by a partition 19. A gate valve (not shown) is disposed in front of the partition 19 and is moved to a closed position when the mass spectrometer 210 is not in operation. An orifice 21 is formed in the partition 19 enabling the focused ion beam to pass into the third vacuum chamber 13. The third vacuum chamber 13 contains first mass analyzer, such as representative first quadrupole mass filter 20. The first quadrupole mass filter 20 transmits the ion beam to the fourth vacuum chamber 14 with improved mass selectivity and mass resolution, while preventing transmission of gas, such as plasma gas, carrier gas or auxiliary gas, for example. The first quadrupole mass filter 20 may include two pairs of aligned rods, to which direct current (DC) and alternating current (AC) are applied for generating an electrical field that rejects undesirable ions. The first quadrupole mass filter 20 includes filter body 20b and ion guides 20a, 20c provided at the front and rear ends of the body 20b. The third vacuum chamber 13 is evacuated separately from the second vacuum chamber 12 to a pressure in a range of about $1 \times 10^{-4}$ Pa to about $2 \times 10^{-2}$ Pa, for example, by connecting it to the second inlet 42 of the split-flow turbo molecular pump 40. As in the case of the second vacuum chamber 12, the connection of the third vacuum chamber 13 is made via a conduit 46, which may be a flexible tube or a groove formed in the pump housing and/or the vacuum chamber housing, for example.

The fourth vacuum chamber 14 is arranged downstream from or behind the third vacuum chamber 13, and is separated from the third vacuum chamber 13 by a partition 23 having an orifice 22. A collision/reaction cell 24 is arranged within the fourth vacuum chamber 14, into which collision/reaction gas 25 may be introduced at a controlled flow rate. For example, the collision/reaction gas 25 may be helium (collision) or hydrogen (reaction). The collision/reaction cell 24 is operated to remove from the transmitted ion beam multi-atomic ions, which may include elements of the carrier gas, plasma gas and/or auxiliary gas, that would otherwise cause spectral interferences. The collision/reaction cell 24 also includes a multipole electrode, such as second quadrupole mass filter 26. It should be noted that the various embodiments are not limited to quadrupole electrodes, and other rod electrodes including, for example, six or eight rod electrodes may also be used, without departing from the scope of the present teachings. The fourth vacuum chamber 14 is connected to the third inlet 43 of the split-flow turbo molecular pump 40 via a conduit 47 which, once again, may be a flexible tube or a groove formed in the pump housing and/or the vacuum chamber housing, for example.

According to the present embodiment, because the fourth vacuum chamber 14 is connected to the third inlet 43 of the pump 40, it is evacuated to a higher pressure (lower vacuum) than the third vacuum chamber 13 connected to the second inlet 42. The fourth vacuum chamber 14 may be evacuated to a pressure of about $1 \times 10^{-3}$ Pa to about $5 \times 10^{-2}$ Pa, for example. Upon introduction of the collision/reaction gas 25 to the collision/reaction cell 24, the pressure in the fourth vacuum chamber 14 may be in a range of about $1 \times 10^{-3}$ Pa to about 0.2 Pa, for example.

According to the reverse order connection between the third and fourth vacuum chambers 13, 14 of the mass spectrometer 210 and the second and third inlets 42, 43 of the split-flow turbo molecular pump 40, respectively, the collision/reaction gas 25 evacuated from the fourth vacuum chamber 14 is drawn into the pump 40 downstream from the second inlet 42 connected to the third vacuum chamber 13. This arrangement eliminates the possibility of the evacuated collision/reaction gas 25 entering the third vacuum chamber 13 and causing problems, such as discharge or decreased sensitivity in connection with the first quadrupole mass filter 20.

A fifth vacuum chamber 15 is arranged at the last stage of the mass spectrometer 210, downstream from the fourth vacuum chamber 14, and is separated from the fourth vacuum chamber 14 via a partition 28 having an orifice 27. A third quadrupole mass filter 29 including an ion guide 29a and a filter body 29b, is disposed within the fifth vacuum chamber 15 as means for extracting ions having a predetermined mass-to-charge ratio. Also disposed within the fifth vacuum chamber 15 behind the quadrupole mass filter 29 is a detector 30, which may be an electron multiplier detector, for example, that measures current passing through the detector 30 or counts each individual ion that strikes the detector 30. A detection signal is sent from the detector 30 to a signal processor (not shown), which may be provided externally from the mass spectrometer 210. The fifth vacuum chamber 15 is connected to the first inlet 41 of the split-flow turbo molecular pump 40 via a conduit 48, which may be a flexible tube or a groove formed in the pump housing and/or the vacuum chamber housing, for example. Since the first inlet 41 is evacuated through all four of the pumping stages of the split-flow turbo molecular pump 40, it is evacuated to a highest vacuum (lowest pressure), which may be in a range of about $1 \times 10^{-5}$ Pa to about $5 \times 10^{-3}$ Pa, for example.

The split-flow turbo molecular pump 40 includes a housing 50, sets of blades 51-54 rotatable about a shaft 55, and a motor 56 that rotates the shaft 55. In the illustrated embodiment, the shaft 55 extends horizontally, lengthwise along the mass spectrometer 210. As is known in the art, each set of blades 51-54 forms a corresponding pumping stage and comprises a series of angled rotor/stator pairs. Thus, gas molecules entering each pumping stage are given momentum towards the exhaust by repeated collision with rapidly spinning rotors. In the depicted embodiment, the pump 40 includes four blade sets 51-54, corresponding to the pumping stages, which are horizontally spaced from each other. The pumping stages are designed to create or maintain vacuum, which decreases from the first to fourth pumping stages (as corresponding pressure increases). The pump 40 is backed by the rotary pump RP, which also evacuates the first vacuum chamber 11, although a separate rotary pump may be used for backing the turbo molecular pump 40 without departing from the scope of the present teachings.

Figure 3:
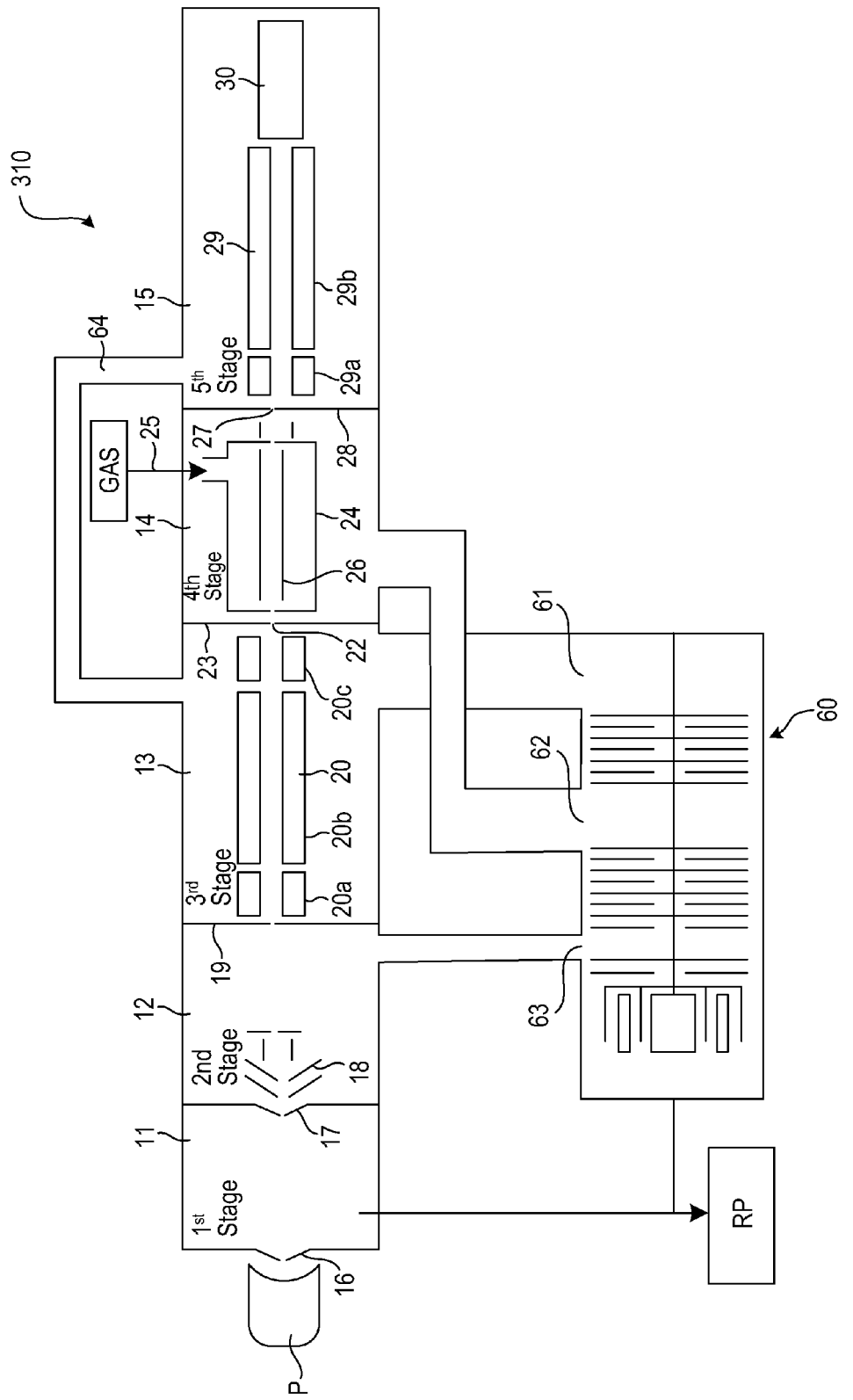
FIG. 3 is a schematic diagram showing a mass spectrometer having differential evacuation construction in accordance with another representative embodiment.

FIG. 3 is a schematic diagram showing a mass spectrometer having differential evacuation construction in accordance with another representative embodiment. Components similar or identical to the components shown in FIG. 2 have the same reference numerals and are not described again.

Referring to FIG. 3, a single split-flow turbo molecular pump 60 has only three inlets, first through third inlets 61-63, in use. In the depicted embodiment, the third vacuum chamber 13 and the fifth vacuum chamber 15 of the mass spectrometer 310 are connected with each other through a separate flow passage or conduit 64. The conduit 64 may be a flexible tube, such as a rubber bellows externally extending between the third and fifth chambers 13 and 15, or a groove formed in the housing of the mass spectrometer 310, for example. The first inlet 61 is connected to the third vacuum chamber 13, the second inlet 62 is connected to the fourth vacuum chamber 14, and the third inlet 63 is connected to the second vacuum chamber 12, as shown in the FIG. 3. Alternatively, the first inlet 61 may be connected to the fifth vacuum chamber 15, rather than the third vacuum chamber 13, with substantially the same effect.

Since the fifth vacuum chamber 15 is connected to the third vacuum chamber 13 through the conduit 64, the fifth vacuum chamber 15 is evacuated to the same level of vacuum as the third vacuum chamber 13, which may be as low as about $1 \times 10^{-5}$ Pa, for example. In an embodiment, the conduit 64 may have as large a cross-section as possible and as short a length as possible to maximize the flow conductance of the conduit 64. As in the embodiment depicted in FIG. 2, the configuration of FIG. 3 also prevents the collision/reaction gas 25 introduced into the collision/reaction cell 24 within the fourth vacuum chamber 14 from entering the third vacuum chamber 13 through the vacuum system, while using a single turbo molecular pump 60 for efficiently evacuating the second to fifth vacuum chambers 12 to 15 of the mass spectrometer 310.

Figure 4:
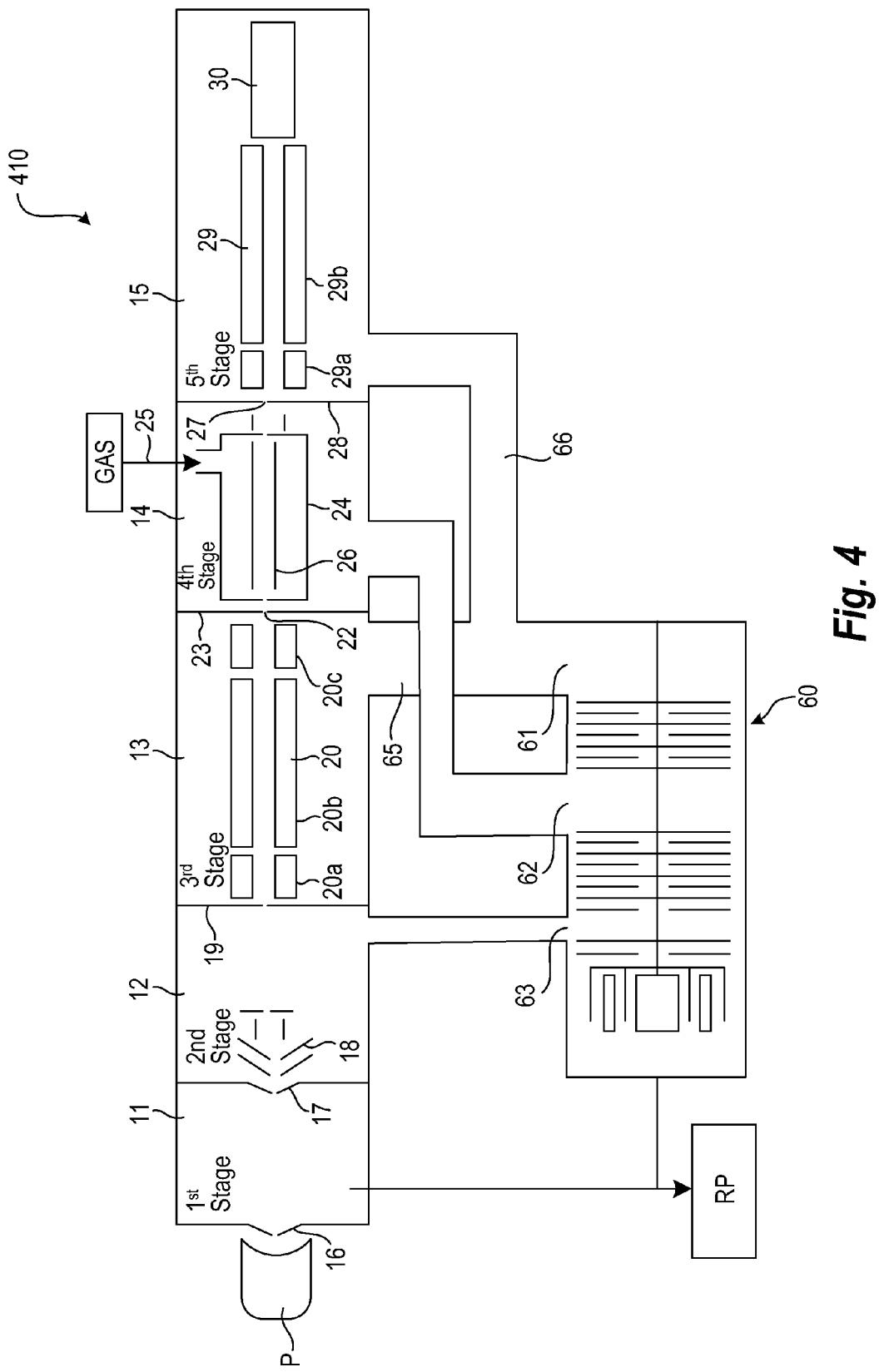
FIG. 4 is a schematic diagram showing a mass spectrometer having differential evacuation construction in accordance with still another representative embodiment.

FIG. 4 is a schematic diagram showing a mass spectrometer having differential evacuation construction in accordance with another representative embodiment. Components similar or identical to the components shown in FIGS. 2 and 3 have the same reference numerals and are not described again.

The embodiment depicted in FIG. 4 is similar to the embodiment depicted in FIG. 3 in that the split-flow turbo molecular pump 60 has only three inlets in use, and the third vacuum chamber 13 and the fifth vacuum chamber 15 are connected with each other. However, instead of conduit 64, the connection is made by converging conduits extending from the third and fifth vacuum chambers 13, 15 before entry into the split-flow turbo molecular pump 60. For example, conduit 65 extends between the third vacuum chamber 13 and the first inlet 61 of the pump 60, and conduit 66 extends between the fifth vacuum chamber 15 and the conduit 65 (branching into the conduit 65). The third and fifth vacuum chambers 13, 15 are therefore able to be evacuated to the same vacuum level, as discussed above.

While specific embodiments are disclosed herein, many variations are possible, which remain within the concept and scope of the invention. Such variations would become clear after inspection of the specification, drawings and claims herein. The invention therefore is not to be restricted except within the scope of the appended claims.

What is claimed is:

1. A mass spectrometer, comprising:
a first vacuum chamber configured to draw an ionized sample from atmospheric pressure plasma;
a second vacuum chamber connected to the first vacuum chamber;
a third vacuum chamber connected to the second vacuum;
a fourth vacuum chamber connected to the third vacuum chamber;
a fifth vacuum chamber connected to the fourth vacuum chamber; and
a single split-flow turbo molecular pump having a plurality of inlets for differentially evacuating the second, third, fourth and fifth vacuum chambers,
wherein the fourth vacuum chamber is connected to an inlet of the split-flow pump providing a pressure higher than a pressure of an inlet of the split-flow pump to which the third vacuum chamber is connected.

2. The mass spectrometer of claim 1, wherein split-flow pump is a split-flow turbo molecular pump.

3. The mass spectrometer of claim 1, wherein the first vacuum chamber is evacuated by a rotary pump, and the split-flow pump is a split-flow molecular pump.

4. The mass spectrometer of claim 3, wherein the split-flow turbo molecular pump is backed by the rotary pump.

5. The mass spectrometer of claim 1, wherein the third vacuum chamber is evacuated to a pressure in a range of about $1 \times 10^{-4}$ Pa to about $2 \times 10^{-2}$ Pa.

6. The mass spectrometer of claim 5, wherein the fourth vacuum chamber is evacuated to a pressure in a range of about $1 \times 10^{-3}$ Pa to about $5 \times 10^{-2}$ Pa.

7. The mass spectrometer of claim 1, wherein the second vacuum chamber is connected to an inlet of the split-flow pump providing a lowest vacuum.

8. The mass spectrometer of claim 7, wherein the fifth vacuum chamber is connected to an inlet of the split-flow pump providing a highest vacuum.

9. The mass spectrometer of claim 1, wherein the third vacuum chamber and the fifth vacuum chamber are connected with each other.

10. The mass spectrometer of claim 1, wherein the split-flow pump comprises first to fourth inlets providing first to fourth vacuum levels, respectively, that decrease in order from the first inlet to the fourth inlet, and
wherein the first inlet is connected to the fifth vacuum chamber, the second inlet is connected to the third vacuum chamber, the third inlet is connected to the fourth vacuum chamber, and the fourth inlet is connected to the second vacuum chamber.

11. The mass spectrometer of claim 1, wherein the split-flow pump comprises first to third inlets providing first to third vacuum levels, respectively, that decrease in order from the first inlet to the third inlet, and
wherein the first inlet is connected to the third vacuum chamber, the second inlet is connected to the fourth vacuum chamber, and the third inlet is connected to the second vacuum chamber, and wherein the fifth vacuum chamber is connected to the third vacuum chamber via a conduit.

12. The mass spectrometer of claim 1, wherein the split-flow pump comprises first to third inlets providing first to third vacuum levels, respectively, that decrease in order from the first inlet to the third inlet, and
wherein the first inlet is connected to the third vacuum chamber and the fifth vacuum chamber via converging conduits, the second inlet is connected to the fourth vacuum chamber, and the third inlet is connected to the second vacuum chamber.

13. The mass spectrometer of claim 1, wherein the fourth vacuum chamber is connected to the corresponding inlet of the split-flow pump via a first conduit and the third vacuum chamber is connected to the corresponding inlet of the split-flow pump via a second conduit.

14. The mass spectrometer of claim 13, wherein each of the first and second conduits is a flexible tube.

15. The mass spectrometer of claim 13, wherein each of the first and second conduits is a groove formed in at least one of a housing of the vacuum chambers and a housing of the split-flow pump.

16. An atmospheric pressure plasma mass spectrometer comprising:
a vacuum chamber housing comprising, sequentially, first to fifth vacuum chambers, wherein the third vacuum chamber contains a first mass analyzer and the fourth vacuum chamber contains a collision/reaction cell;
a rotary pump for evacuating the first vacuum chamber; and
a single split-flow turbo molecular pump for differentially evacuating the second to fifth vacuum chambers,
wherein the fourth vacuum chamber is connected to an inlet of the single split-flow turbo molecular pump providing a vacuum lower than a vacuum provided by an inlet of the split-flow turbo molecular pump to which the third vacuum chamber is connected.

17. The mass spectrometer of claim 16, wherein the split-flow turbo molecular pump comprises first to fourth inlets providing first to fourth vacuum levels, respectively, that decrease in order from the first inlet to the fourth inlet, and
wherein the first inlet is connected to the fifth vacuum chamber, the second inlet is connected to the third vacuum chamber, the third inlet is connected to the fourth vacuum chamber, and the fourth inlet is connected to the second vacuum chamber.

18. The mass spectrometer of claim 16, wherein the split-flow turbo molecular pump comprises first to third inlets providing first to third vacuum levels, respectively, that decrease in order from the first inlet to the third inlet, and wherein the first inlet is connected to the third vacuum chamber, the second inlet is connected to the fourth vacuum chamber, and the third inlet is connected to the second vacuum chamber, and wherein the fifth vacuum chamber is connected to the third vacuum chamber via a conduit.

19. The mass spectrometer of claim 16, wherein the split-flow turbo molecular pump comprises first to third inlets providing first to third vacuum levels, respectively, that decrease in order from the first inlet to the third inlet, and wherein the first inlet is connected to the third vacuum chamber and the fifth vacuum chamber via converging conduits, the second inlet is connected to the fourth vacuum chamber, and the third inlet is connected to the second vacuum chamber.

20. A mass spectrometer, comprising:

a plurality of vacuum chambers arranged in series for receiving sample ions from atmospheric pressure plasma, wherein one vacuum chamber of the plurality of vacuum chambers includes a quadrupole mass filter and receives an ion beam of the sample ions from a previous vacuum chamber, and an adjacent vacuum chamber of the plurality of vacuum chambers, downstream from the one vacuum chamber, includes a collision reaction cell for introducing collision/reaction gas and receives the ion beam from the quadrupole mass filter of the one vacuum chamber; and a single split-flow turbo molecular pump having a plurality of inlets for differentially evacuating the plurality of vacuum chambers, respectively, wherein the one vacuum chamber is connected to one inlet of the split-flow turbo molecular pump providing a vacuum higher than a vacuum provided by another inlet of the split-flow turbo molecular pump to which the adjacent vacuum chamber is connected.

* * * * *

UNITED STATES PATENT AND TRADEMARK OFFICE
CERTIFICATE OF CORRECTION

PATENT NO. : 8,481,923 B1  
APPLICATION NO. : 13/537285  
DATED : July 9, 2013  
INVENTOR(S) : Jun Kitamoto Page 1 of 1

It is certified that error appears in the above-identified patent and that said Letters Patent is hereby corrected as shown below:

Title page, item (57), under "ABSTRACT", in column 2, line 7, Delete "fourth vacuum" and insert -- fourth vacuum chamber --, therefor.

In the Claims:

In column 9, line 37, In Claim 1, Delete "second vacuum;" and insert -- second vacuum chamber; --, therefor.

Signed and Sealed this  
Twenty-seventh Day of May, 2014

Michelle K. Lee  
*Deputy Director of the United States Patent and Trademark Office*